May 31, 1938.   H. V. REED   2,119,026
CLUTCH PLATE
Filed Feb. 11, 1935
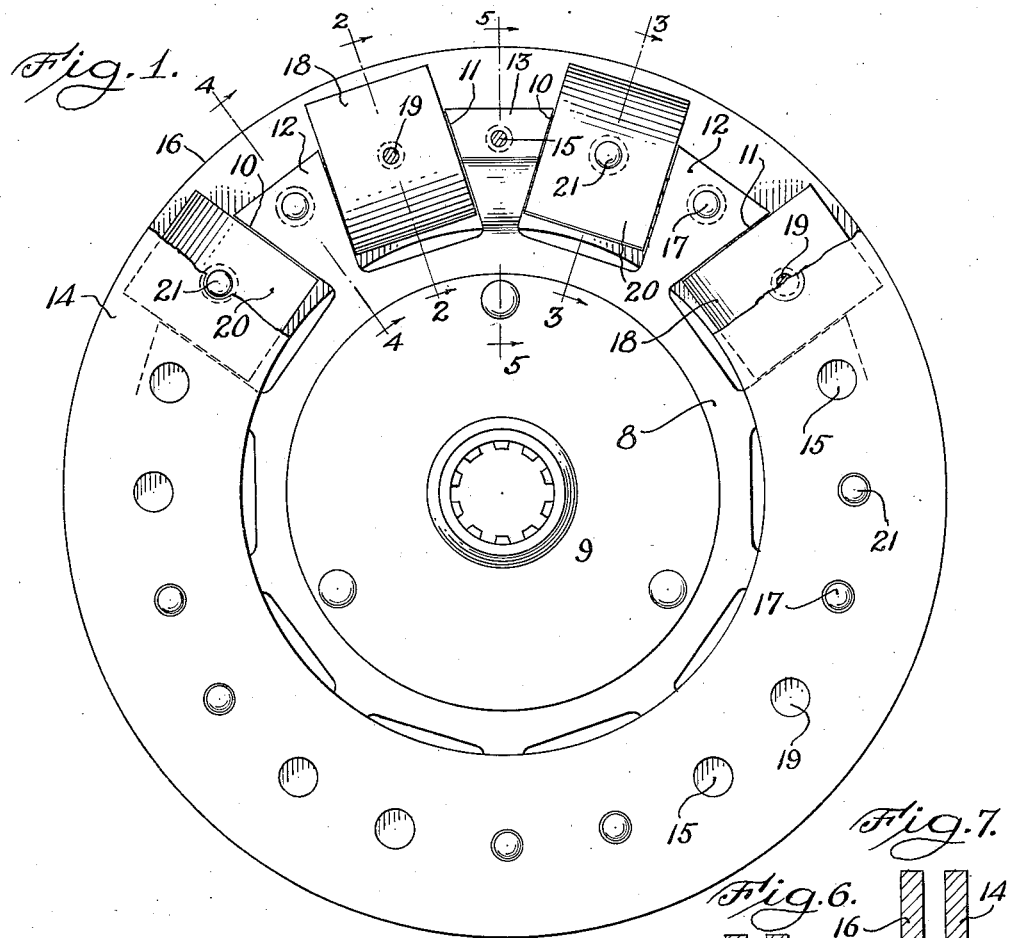
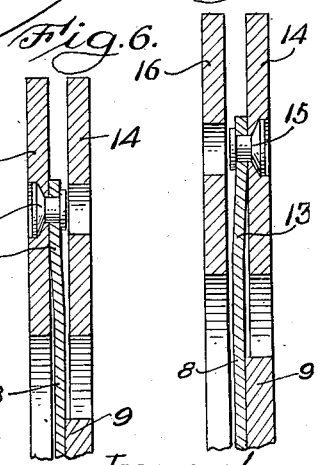
Inventor;
Harald V. Reed
BY
Wm. O. Belt
Attorney.

Patented May 31, 1938

2,119,026

UNITED STATES PATENT OFFICE 2,119,026

CLUTCH PLATE

Harold V. Reed, Chicago, Ill., assignor to Borg-Warner Corporation, Chicago, Ill., a corporation of Illinois Application February 11, 1935, Serial No. 5,943

7 Claims. (Cl. 192—107)

This invention relates to friction clutches for automotive vehicles and it may also be used in other friction clutches for which it is or may be adapted.

The primary object of the invention is to retain separate cushion members in operative position between the facings of a clutch plate without riveting them to the disc but holding them fixedly in place and utilizing the facings for this purpose thereby providing an improved and more efficient clutch plate and reducing the chattering and grabbing in the clutch.

Another object is to facilitate the assembling of a cushioned clutch plate having separate cushion members by fastening the cushion members to the facings and then fastening the facings with the cushion members thereon to the disc.

A further object is to provide a cushioned clutch plate of less weight than similar clutch plates made heretofore without decreasing the efficiency thereof and so that there will be less strain on the plate due to the centrifugal force developed in the use thereof.

In the accompanying drawing illustrating the invention—

Fig. 1 is a plan view of a clutch plate showing one facing partly broken away;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1;

Fig. 5 is a sectional view on the line 5—5 of Fig. 1;

Fig. 6 is a sectional view similar to Fig. 4 and showing another form of the invention; and Fig. 7 is a sectional view similar to Fig. 5 showing the same form of the invention shown in Fig. 6.

Referring to the drawing, the clutch plate selected for illustration comprises a disc 8 secured to a hub member 9 which is adapted to be mounted on a driven shaft of an automotive vehicle. The disc has recesses 10 and 11 extending inwardly from the periphery thereof which recesses are spaced by tongues 12 and 13. The tongues 12 lie in the plane of the disc while the alternate tongues 13 are struck from the plane of the disc and are offset on one side thereof. A friction facing 14 is provided on one side of the disc and is fastened to the offset tongues 13 by rivets 15. The facing 14 is spaced from the plane of the disc by the offset tongues thus to permit the facings to move axially relative to one another upon yielding of the tongues 14, as during compression of the clutch plate. Another friction facing 16 is fastened on the other side of the disc to the tongues 12 by rivets 17. Both the tongues 12 and the tongues 13 lie within the confines of the periphery of the annular facings 14 and 16 as best shown in Fig. 1. Cushion members 18 are fastened to the facing 14 by rivets 19 and cushion members 20 are fastened to the friction facing 16 by rivets 21. The cushion members are preferably made of spring metal and are so arranged and spaced on the facings that they fit in the recesses in the disc. The cushion members are curved so that the central portion of each cushion member is in engagement with the facing to which it is fastened and the ends of the cushion members are in engagement with the opposite facing, Figs. 2, 3.

In the form shown in Figs. 1 to 5 the facing 16 is flush against the side of the disc and the facing 14 is spaced from the disc by the offset tongues 13. However, the tongues 12 may be offset on one side of the disc and thereby space the facing 16 from the disc as shown in Figs. 6, 7.

My invention provides a highly efficient cushion clutch plate wherein tongues are employed to maintain the facings in parallelism and cushion members, separate and independent from the disc, provide yielding engagement for the clutch plate. The weight of the disc is materially reduced over past constructions by providing the recesses 10 and 11 and by terminating the periphery of the disc well within the outer diameter of the facings. The cushion members, because they are separate and independent of the disc, can be made of higher grade material than is required in the disc and for this reason need not be as thick nor as heavy as the material of the disc. The cushion members are not mounted directly on the disc nor riveted thereto and therefore the distortion and strain placed on the disc by such mounting and riveting is eliminated.

While I have shown and described the invention in a particular type of clutch plate I do not mean thereby to restrict the invention to the embodiments illustrated nor to the type of clutch plate shown for it can be employed in many different embodiments and kinds of clutches and clutch plates with satisfactory results; and therefore I reserve the right to use the invention in any form and for any purpose for which it is or may be adapted within the scope of the following claims.

I claim:

1. A clutch plate comprising a disc having a plurality of spaced apart radially extending tongues at the periphery thereof, friction facings arranged on opposite sides of the disc in register with the tongues, cushion members between the facings and located between the tongues, and means fastening adjacent cushion members to opposite facings.

2. A clutch plate comprising a disc having a plurality of spaced apart radially extending tongues at the periphery thereof, friction facings arranged on opposite sides of the disc, means fastening the facings to the tongues alternately, cushion members between the facings and arranged in the spaces between the tongues, and means fastening adjacent cushion members to opposite facings.

3. A clutch plate comprising a disc having a plurality of spaced apart radially extending tongues at the periphery thereof, alternate tongues being offset from the plane of the disc and on one side thereof and the other tongues lying in the plane of the disc, friction facings arranged on opposite sides of the disc, means fastening the facing on one side of the disc to the offset tongues and means fastening the facing on the other side of the disc to the other tongues, cushion means in the spaces between the tongues and between the facings, the cushion members being alternately and oppositely curved so that the inner and outer ends of alternate cushion members will engage the same facing and the central portion of said alternate cushion members will engage the opposite facing, and means fastening each cushion member to the facing engaged by the central portion thereof.

4. A clutch plate comprising a disc having a plurality of spaced apart radially extending tongues at the periphery thereof, alternate tongues being offset from the plane of the disc on one side thereof and the other tongues being offset from the plane of the disc on the other side thereof, friction facings on opposite sides of the disc, means fastening each facing to the tongues which are offset on its side of the plane of the disc, curved cushion members in the spaces between the tongues and between the facings, and means fastening adjacent cushion members to opposite facings.

5. A clutch plate comprising a disc having a plurality of spaced apart radially extending tongues at the periphery thereof, friction facings on opposite sides of the disc and fastened to the tongues, and cushion members fastened to the facings and arranged in the spaces between the tongues and between the facings to cushion the engagement of the clutch, the free ends of the tongues being within the outer diameter of the facings.

6. A clutch plate comprising, a metal disc having a plurality of spaced apart radially extending tongues at the periphery thereof, a pair of annular friction facing members, a plurality of cushion members of relatively thin sheet metal secured upon one side of each of said facings in spaced apart relationship with one another, and means providing a mounting for said facings upon said disc and so arranged as to fix the facings against rotation relative to the disc, but to permit movement of the facings relative to one another along the axis of the disc, certain of said cushion members being disposed in the spaces between certain of the adjacent of said tongues, and the remainder of said cushions being disposed in the remaining spaces between said tongues.

7. A clutch plate comprising, a disc of relatively heavy sheet metal, friction facings arranged on opposite sides of the disc in register with the peripheral portion thereof, said disc having circumferentially spaced portions thereof in register with said facings cut away, relatively light metal cushion members between the opposed inner faces of said facings and located within said cut away portions of said disc and secured alternately to opposite facings, and means securing the disc portions between said cushion members alternately to opposite facings.

HAROLD V. REED.